(12) United States Patent
Hahn

(10) Patent No.: US 6,985,612 B2
(45) Date of Patent: Jan. 10, 2006

(54) COMPUTER SYSTEM AND A METHOD FOR SEGMENTATION OF A DIGITAL IMAGE

(75) Inventor: Horst Hahn, Bremen (DE)

(73) Assignee: MeVis - Centrum fur Medizinische Diagnosesysteme und Visualisierung GmbH, Bremen (DE)

( * ) Notice: Subject to any disclaimer, the term of this patent is extended or adjusted under 35 U.S.C. 154(b) by 841 days.

(21) Appl. No.: 09/972,030

(22) Filed: Oct. 5, 2001

(65) Prior Publication Data
US 2003/0068074 A1 Apr. 10, 2003

(51) Int. Cl.
*G06K 9/00* (2006.01)

(52) U.S. Cl. ............... 382/128; 382/169; 382/173; 382/171; 382/274; 382/240; 382/226

(58) Field of Classification Search .......... 382/128, 382/130, 131, 132, 168, 171, 172, 173, 274, 382/226, 242, 176; 128/922; 356/39; 377/10
See application file for complete search history.

(56) References Cited

U.S. PATENT DOCUMENTS

| 5,262,945 | A | | 11/1993 | DeCarli et al. |
| 5,425,368 | A | | 6/1995 | Brandt |
| 5,463,698 | A | | 10/1995 | Meyer |
| 5,867,605 | A | * | 2/1999 | Oliveras et al. ............. 382/260 |
| 5,903,664 | A | | 5/1999 | Hartley et al. |
| 5,933,518 | A | * | 8/1999 | Cohen-Solal ............... 382/132 |
| 6,075,875 | A | * | 6/2000 | Gu .............................. 382/107 |
| 6,262,409 | B1 | * | 7/2001 | Avaro et al. ............. 250/208.1 |
| 6,332,034 | B1 | * | 12/2001 | Makram-Ebeid et al. ... 382/128 |
| 6,728,314 | B2 | * | 4/2004 | Kan et al. ............... 375/240.12 |
| 6,771,834 | B1 | * | 8/2004 | Martins et al. ............. 382/257 |
| 6,832,002 | B2 | * | 12/2004 | Baatz et al. ................ 382/173 |
| 2001/0048753 | A1 | * | 12/2001 | Lee et al. ................... 382/103 |
| 2001/0055421 | A1 | * | 12/2001 | Baatz et al. ................ 382/173 |
| 2002/0154798 | A1 | * | 10/2002 | Cong et al. ................ 382/128 |
| 2003/0012430 | A1 | * | 1/2003 | Risson ....................... 382/165 |

(Continued)

FOREIGN PATENT DOCUMENTS

JP 2001195599 A * 6/2001

OTHER PUBLICATIONS

Vincent et al, Watersheds in Digital Space, pp. 580-595.*

(Continued)

*Primary Examiner*—Barry Choobin
*Assistant Examiner*—Bhavesh M. Mehta
(74) *Attorney, Agent, or Firm*—Martin Fleit; Paul D. Bianco; Fleit, Kain, Gibbons, Gutman, Bongini & Bianco P.L.

(57) ABSTRACT

The invention relates to a method for segmentation of a digital image being represented by picture element data for the purposes of visualization, segmentation and quantification, such as determining the volume of a segment. The method comprises the steps of performing a watershed transformation of the digital image by applying a watershed transformation method on the picture element data to provide one or more basins and post-processing by processing the picture element data belonging to at least one of the basins, where post-processing is one or a combination of the following steps: (i) gray-scale based segmentation, (ii) visualization using a transfer function, or (iii) volumetry using histogram analysis.

20 Claims, 7 Drawing Sheets

U.S. PATENT DOCUMENTS

| | | | |
|---|---|---|---|
| 2003/0039376 A1* | 2/2003 | Stach | 382/100 |
| 2003/0076980 A1* | 4/2003 | Zhang et al. | 382/103 |
| 2003/0080978 A1* | 5/2003 | Navab et al. | 345/633 |
| 2003/0169946 A1* | 9/2003 | Bamford et al. | 382/308 |
| 2003/0207250 A1* | 11/2003 | Kaufman et al. | 435/4 |
| 2004/0227756 A1* | 11/2004 | Dicken | 345/424 |
| 2004/0258305 A1* | 12/2004 | Burnham et al. | 382/171 |
| 2004/0264749 A1* | 12/2004 | Skladnev et al. | 382/128 |
| 2005/0064602 A1* | 3/2005 | Kaufman et al. | 436/164 |

OTHER PUBLICATIONS

K.H. Hoehne and W.A. Hanson, "Interactive 3D segmentation of MRI and CT volumes using morphological operations", J Computer Assisted Tomography 16(2): 185-294, 1992.

L. Lemieux, G. Hagemann, K. Krakow, and F.G. Woermann, "Fast, acurate, and reproducible automatic segmentation of the brain in T1-weighted volume MRI data", Magnetic Resonance in Medicine 42(1): 127-35, Jul. 1999.

A.M. Dale, B. Fischl, and M.I. Sereno, "Cortical surface-based analysis I: Segmentation and surface reconstruction", NeuroImage 9: 179-194, 1999.

R.J. van der Geest, V.G.M. Buller, E. Jansen, H.J. Lamb, L.H.B. Baur, E.E. van der Wall, A. de Roos, and J.H.C. Reiber, "Comparison between manual and semi-automated analysis of left ventricular volume parameters from short-axis MR images", J Computer Assisted Tomography 21(5): 756-765, 1997.

J. Sijbers, P. Scheunders, M. Verhoye, A. Van der Linden, D. Van Dyck, and E. Raman, "Watershed-based segmentation of 3D MR data for volume quantization", Magnetic Resonance Imaging 15(4), 1997.

H.K. Hahn and H.-O. Peitgen, "The Skull Stripping Problem In MRI Solved By A Single 3D Watershed Transformation", Medical Image Computing and Computer-Assisted Intervention (MICCAI 2000), Pittsburgh, Springer LNCS: 134-143, 2000.

* cited by examiner

COMPUTER SYSTEM AND A METHOD FOR SEGMENTATION OF A DIGITAL IMAGE

FIELD OF THE INVENTION

The present invention relates to the field of segmentation of digital images, in particular medical digital images, and more particularly to the field of visualization of segments corresponding to anatomical structures and to the measurement of the volumes of such anatomical structures.

BACKGROUND AND PRIOR ART

Segmentation is a crucial task in visualization and quantification based on digital medical image data. The number of digitally stored medical images and the amount of information stored in each image both are steadily increasing, thus increasing the importance of robust and fast segmentation methods at the same time. Robustness refers to the ability of the method to: (i) work in presence of image disturbance, (ii) with a low failure rate, and (iii) to work for a wide range of different images and patients.

Still many specific segmentation problems persist that have not been solved satisfactorily. Each problem is defined by: (i) the imaging modality, (ii) the imaged organ, and (iii) the task to be performed on the images. Examples for such segmentation problems are removal of non-brain tissue in three-dimensional (3D) magnetic resonance (MR) images of the human head, or segmentation of left and right ventricle in cardiac MR cine images on all slices and time points.

The prior art shows a variety of segmentation methods:

Manual Segmentation

Manual tracing for object segmentation is usually performed on all two-dimensional slices of a three-dimensional image dataset that contain the structure of interest. Manual interaction is preferably applied on an intermediate level of detail, where local and global image features have to be taken into account. In these cases, manual interaction often yields more accurate results than fully automated methods.

For example, when tracing the brain contours on one 2D slice that is part of series of MR images, a trained operator combines detailed knowledge about the individual anatomy (such as brain, cerebellum, peripheral nerves and neighboring blood vessels).

Segmentation problems of this kind are suited for manual processing. Even within the framework of semi-automated methods for the, e.g., histogram based quantification of different tissue types, manual tracing is the preferred method for the selection of an appropriate region of interest (ROI).

U.S. Pat. No. 5,262,945 shows such a method for quantification of brain volume from magnetic resonance images.

There are several problems with manual segmentation preventing it from being routinely used in many cases: (i) Interaction and time costs (manual tracing takes several minutes per image), (ii) requirement for sufficient training (the segmentation result is highly dependent on the level of training), (iii) requirement for care and concentration during segmentation (quality and precision of human interaction is not constant), and (iv) reduction of objectivity (different operators will generate different results).

The growing number of digitally stored medical images as well as the advances in scanner resolution, combined with high personnel costs are another reason for manual segmentation to become even less applicable in the future. At the same time, the need for efficient and reliable automated or semi-automated segmentation methods is growing.

Thresholding and Morphology

The second group of segmentation methods is thresholding in combination with morphology, as described in K. H. Hoehne and W. A. Hanson, "Interactive 3D segmentation of MRI and CT volumes using morphological operations", J Computer Assisted Tomography 16(2): 185–294, 1992.

As a first step, the structure of interest is roughly separated from the background by simple gray scale thresholding, resulting in a binary image. In the brain segmentation problem on T1-weighted MR images, very bright (e.g. fat) and very dark (e.g. bone, air) parts of the image are suppressed using appropriate thresholds. In some cases, the brain is represented by the largest remaining connected structure. This structure in the binary image can be applied as a mask to the original data.

In most cases, however, the structure representing the brain in the binary image is connected to neighboring structures (caused by nerves, blood vessels, image non-uniformity, or limitations of image resolution). In order to separate the brain from other structures, morphological filter operations can be used; morphological opening suppresses thin structures whilst preserving thicker ones. L. Lemieux, G. Hagemann, K. Krakow, and F. G. Woermann, "Fast, accurate, and reproducible automatic segmentation of the brain in T1-weighted volume MRI data", Magnetic Resonance in Medicine 42(1): 127–35, July 1999, describe a series of thresholding and morphological operations that aims to solve the shortcomings of this simple approach.

Another application of thresholding is described in U.S. Pat. No. 5,903,664. For fast segmentation of cardiac images, a ROI and a seed point within the ROI are manually selected. An operator-defined threshold is used to acquire a first segmentation of, e.g., the left cardiac ventricle on that slice. This segmentation is defined as a set of connected pixels showing gray values above the threshold and including the seed point. From that first segmentation, a histogram is computed. A further threshold is selected which separates modes of the histogram and is used to carry out a revised, final segmentation of the current image. The centroid of the current segmentation is used as a seed point in segmenting adjacent images.

Within the framework of thresholding and morphological operations, the user normally interactively specifies thresholds, filter sizes, or the number of iterations, in order to produce a correct segmentation. A fully automated system of thresholding and morphology tends to fail in many cases, e.g., when the image acquisition parameters vary. Furthermore, the results often need final manual editing.

The results presented by Lemieux et al. (1999) show a progress in terms of automated thresholding and morphological operations. However, this method is tuned to a narrow range of image types. In particular, the result is dependent on the overall homogeneity of the image. The algorithm will fail in presence of moderate contrast non-uniformity, since no threshold can be found that is appropriate for all parts of the image.

In general, this weakness against image inhomogeneities is characteristic for all segmentation methods comprising global thresholding.

Statistical Methods

U.S. Pat. No. 5,425,368 describes a method for estimating tissue volumes in MR images. More precisely, a fuzzy logic approach to the problem of distinguishing cerebrospinal fluid, gray and white matter pixels is presented. An unsupervised fuzzy clustering procedure based on a variant of the fuzzy c-means algorithm computes the percentage of each of these three compartments in each image automatically, with virtually no operator intervention. Each volume element represented in the image can belong to all compartments in varying degrees. The procedure requires input of the number of different compartments in the image, as well as a parameter which determines the amount of overlap of compartment boundaries. The method has been applied to the diagnosis of hydrocephalus.

Statistical segmentation methods are useful, but target another class of segmentation problems. In general, statistical methods only converge to an appropriate solution after the original image has been segmented, so that a small set of known tissue types remains plus additional noise and non-uniformity. A statistical method could be, for example, a subsequent step to brain segmentation, also referred to as skull stripping, i.e. the removal of non-brain tissue in neuroanatomical images. Conversely, statistical methods such as described in U.S. Pat. No. 5,425,368 are not applicable to the original MR images directly.

Deformable Template Based Segmentation

The third group of segmentation methods uses deformable templates. From A. M. Dale, B. Fischl, and M. I. Sereno, "Cortical surface-based analysis I: Segmentation and surface reconstruction", NeuroImage 9: 179–194, 1999, a surface model in terms of a tessellated mesh is known. This model is fitted to the brain surface in T1-weighted MR images in order to separate the brain from surrounding tissue. During the fitting process, two constraints are applied to the surface geometry: (i) A smoothness term (avoiding unnaturally folded surfaces), and (ii) an image term (keeping the surface close to the desired structure, here the brain surface).

During the fitting process, the surface is deformed by iteratively applying these constraints. Since the constraints take into account neighborhood information, and this information is iteratively propagated over the surface, deformable templates are suited to solve non-local segmentation problems. Deformable templates seem to be more robust and easier to automate than thresholding and morphology.

The goal of Van der Geest et al (R. J. van der Geest, V. G. M. Buller, E. Jansen, H. J. Lamb, L. H. B. Baur, E. E. van der Wall, A. de Roos, and J. H. C. Reiber, "Comparison between manual and semi-automated analysis of left ventricular volume parameters from short-axis MR images", J Computer Assisted Tomography 21(5): 756–765, 1997) is to evaluate a semi-automated template based contour detection algorithm for the quantitative analysis of cardiovascular MRI. Left ventricular function parameters derived from automatically detected endocardial and epicedial contours were compared with results derived from manually traced contours in short-axis multislice GRE MRI studies of 10 normal volunteers and 10 infarct patients. Compared with manual image analysis, the semi-automated method resulted in smaller systematic and random differences for volume, ejection fraction, and wall thickness of the left cardiac ventricle.

A problem with template driven segmentation is caused by geometrical or anatomical variations. For pathological cases, e.g., templates often are not applicable. Interaction techniques integrated in template based segmentation algorithms can only serve to constrain parameters, but not to deal with variations beyond the model.

Segmentation Based on the Watershed Transformation (WT)

The aim of Sijbers et al. (1997) (J. Sijbers, P. Scheunders, M. Verhoye, A. Van der Linden, D. Van Dyck, and E. Raman, "Watershed-based segmentation of 3D MR data for volume quantization", Magnetic Resonance Imaging 15(4), 1997) is the development of a semi-automatic segmentation technique for efficient and accurate volume quantization of Magnetic Resonance (MR) data. The proposed technique uses a variant of an immersion based watershed algorithm which is applied to the gradient magnitude of the MR data and which produces small volume primitives.

The known drawback of the watershed algorithm, over-segmentation, is reduced by a priori application of a 3D adaptive anisotropic diffusion filter to the MR data. Furthermore, oversegmentation is a posteriori reduced by properly merging small volume primitives which have similar gray level distributions. The outcome of the preceding image processing steps is presented to the user for manual segmentation. Through selection of volume primitives, the user quickly segments the first slice which contains the object of interest. Afterwards, the subsequent slices are automatically segmented by extrapolation.

U.S. Pat. No. 5,463,698 shows a fast implementation of the watershed transformation (WT) with markers based on hierarchically organized queues. The problem that is solved by the present invention, being the separation of structures that exhibit similar gray scale characteristics, is not touched by this realization.

Hahn et al (H. K. Hahn and H.-O. Peitgen, "The Skull Stripping Problem In MRI Solved By A Single 3D Watershed Transformation", Medical Image Computing and Computer-Assisted Intervention (MICCAI 2000), Pittsburgh, Springer LNCS: 134–143, 2000), the disclosure of which being expressly incorporated herein by reference, have been the first to describe the direct application of the WT to a three-dimensional medical imaging problem. No gradient or edge information is derived prior to the transformation.

A priori, it is not clear that such a strategy could produce the desired results. However, there is a class of problems that can be solved by the direct application of the WT. In these cases the main problem consists of separating an object of interest from neighboring structures that exhibit a similar image intensity, but are separated by a thin layer of slightly darker or brighter tissue. In Hahn et al. (2000) the brain was separated in T1-weighted MR images, much as in Dale et al. (1999), but with an increase in robustness.

Watershed segmentation offers promising approaches to robust segmentation of images. The WT can be directly extended to 3D and even 4D and higher dimensional problems. However, the gradient information of an image, to which the WT is applied in accordance with the prior art, is only suited to yield appropriate results if the object borders exhibit image gradients that are higher than the gradients inside the object.

SUMMARY OF THE INVENTION

It is an object of the present invention to provide a novel method, computer program product and computer system for segmentation of a digital image.

It is another object of the present invention to provide for a segmentation procedure that is robust even against considerable image non-uniformity as well as image noise.

It is a further object of the present invention to provide a segmentation procedure that preserves the full original image information.

It is a further object of the present invention to provide a segmentation procedure with improved user interaction techniques.

It is a further object of the present invention to provide a segmentation procedure using no or only a small number of geometrical assumptions, such as anatomical a priori knowledge.

It is a further object of the present invention to provide a segmentation procedure featuring fully automatic segmentation, especially for high-throughput applications.

It is a further object of the invention to provide a segmentation procedure enabling interactive semi-automatic segmentation.

It is a further object of the present invention to provide a segmentation procedure which is fast and with computational costs that are approximately proportional to the number of picture elements, especially in order to be able to deal with increasing image resolutions.

It is a further object of the present invention to provide a segmentation procedure which enables an accurate measurement of the volume of a certain tissue type based on histogram analysis.

These and other objects of the invention are achieved by a method, computer program product and computer system which employ a watershed transformation method directly on the picture element data. This compares to the prior art where watershed transformation is used with respect to the gradients of the picture element data. As a result of the application of a watershed transformation directly on the picture element data one or more basins are identified in the digital image to be segmented. These basins do not necessarily correspond to the anatomical structures to be segmented.

Therefore a post-processing of the watershed transformed digital image is performed in accordance with the invention. By means of the post-processing a basin of interest is reduced to the anatomical structure of interest to be segmented.

In accordance with a preferred embodiment of the invention this is accomplished by applying a transfer function directly onto the picture element data corresponding to the basin of interest.

In accordance with a further preferred embodiment of the invention a scalar value is determined for each picture element data by applying a transformation function. The transformation function takes only into account the picture element data to be transformed but not—for example—neighboring picture element data. In this preferred embodiment the watershed transformation is then applied onto the scalar values of the transformed picture element data.

In accordance with a further preferred embodiment of the invention the digital image to be segmented is a medical image, such, as a computer tomographic (CT), a magnetic resonance (MR) a T1-weighted MR image or any other kind of digital radiologic image.

In accordance with a further preferred embodiment of the present invention the image data is three-dimensional or four-dimensional. In the latter case the fourth dimension is time.

It is a particular advantage of this embodiment that this way it becomes possible to visualize movements of body organs, such as a pulsing heart, or the flow of body fluids over time.

In accordance with a further preferred embodiment of the invention the post-processing is used to transform the transparency of picture elements in a region between a first tissue type of interest and a second tissue type in accordance with a transfer function in order to gradually increase the transparency of those picture elements. This way a structure of a second tissue type surrounding or enveloping a structure of interest of a first tissue type becomes transparent so that the structure of interest of the first tissue type is visualized. In accordance with a particular embodiment of the invention a four-dimensional color space having a transparency coordinate, such as the RGBA color coordinates, is used.

In accordance with a further preferred embodiment of the invention the volume of an anatomical structure is measured by histogram analysis of the picture element data belonging to the segment containing the tissue type of interest.

The present invention is particularly useful for applications such as:

a. skull stripping,
b. brain segmentation with estimation of brain volumes,
c. segmentation of the cardiac ventricles in cardiac images,
d. cardiac segmentation with estimation of cardiac ventricle volumes,
e. segmentation of the cerebral ventricles, i.e. the intra-cerebral CSF spaces, and to
f. segmentation of the cerebral ventricles with accurate ventricular volumetry,
g. bone segmentation in CT images,
h. segmentation and accurate volumetry of lung nodules and similar tumors.

An essential element of the invention is the watershed transformation (WT), which is directly applied to the picture element data or the corresponding scalar values. This is in contrast to the prior art where the gradient information of an image is watershed transformed.

Similar to thresholding and region growing techniques, the WT partitions an image into regions, so-called basins. However, there is not a specific gray value, e.g. a threshold, that determines the basin borders. Watersheds, being the borders of the basins resulting from the WT, are throughout constructed at connected local image maxima (so-called crest lines). Connected local image minima (so-called valleys), can be transformed into crest lines via gray level inversion. The WT is thus robust against image disturbance, such as low-frequency contrast non-uniformity as well as image noise, that does not change positions of local image extrema.

Prior to image segmentation, it is a goal of image acquisition to produce a contrast between the structure of interest and adjacent structures. In presence of image non-uniformity, threshold based methods will fail. In case of steep image gradients within the structure of interest or of low gradients at their edges, gradient based methods will be likely to give erroneous results. Both problems can be solved if the WT is directly applied to the original image data: Image non-uniformity usually consists of low frequency signals in the space domain and does not change the position of local image minima or maxima; and there are no restrictions regarding the image gradients when applying the WT, as long as the structure of interest is connected.

In contrast to the WT applied to the gradient image, the present approach does not yield the object borders directly. Rather, the direct application of the WT is combined with a gray scale based post-processing. This can be a segmentation step to find object borders after the separation step; another possibility is the direct rendering (e.g., in 2D or 3D) of the result, e.g. using transfer functions; finally, a histogram analysis can be performed after the WT, e.g., in order to assess accurate object volumes taking into account partial volume effects, noise and image non-uniformity.

Connectivity

A basic assumption regarding the objects of interest is their connectivity. Two points of a gray level image are connected, if a path of adjacent voxels exists between them that is at least as bright as the darker one of the two points. When interpreting the image intensity as height information, the emerging landscape consists of several hills corresponding to bright image areas and valleys corresponding to dark image areas (FIG. 2 left). According to the above definition of connectivity, two regions are disconnected, if they are separated by a valley, otherwise they are connected.

In other words, applying the WT to the original data solves a difficult part in image segmentation, i.e. separating the structure of interest from neighboring structures that exhibit similar image intensities. The separation is performed at the most likely line between the two structures. E.g., if two dark regions are grouped on two opposing sides of a slightly brighter line, this line is the place where the watershed will be constructed, when applying the WT to the original image data. The two regions will be attributed to two different basins.

For the segmentation of three-dimensional objects, the three-dimensional WT is applied directly to the original image data. Three-dimensional WT refers to a generalization of the two-dimensional WT; a three-dimensional structuring element takes into account at least the six nearest neighbors of a voxel in order to assess its connectivity. Similarly, we propose to use a four-dimensional WT for the segmentation of a series of three-dimensional images, taking into account the eight nearest neighbors (two in each dimension, the fourth dimension being regarded as time). This can be extended to arbitrary dimensions, by adding the two respective nearest neighbors to the connectivity rule.

For multispectral data, where more than one scalar value is available for each spatial position, much as it is the case in color images (there usually three channels or, resp., spectra are used), a scalar function may be derived by combination of these channels. This scalar function then serves as input data for the WT.

Such derived images can also be computed from a single channel, e.g. from a single 3D image from a CT scanner. One example is the gradient function image. More basic examples are any kind of gray scale transformations (or transfer functions). These can, e.g., aim towards assigning the darkest gray values to the object of interest, such that surrounding tissues are brighter and the places where watersheds are preferably constructed. Finally, the input image can be morphologically transformed, e.g. by erosion, dilation, closing, or opening in order to suppress thin structures.

Controlling Oversegmentation—Preflooding and Markers

The major problem of the WT is oversegmentation, i.e. the tendency to produce too many basins. The invention provides two methods to overcome this problem. First, preflooding can be applied to merge small basins with adjacent basins before constructing watersheds. Second, basins can be marked individually in order to determine the number of basins.

The preflooding concept uses a measure of depth of a certain basin. As long as this depth is greater than a specific preflooding height, the basin will be separated from neighboring deeper basins via the construction of watersheds. If not, it will be merged with the neighboring basin of highest priority. Priority is, e.g., equivalent to absolute basin depth.

In order to account for contrast variations at different image areas, the preflooding height can be a function of the local image characteristic, such as brightness or variance. This function may depend from one ore more parameters.

In order to realize a system, where the parameters of the preflooding concept may be chosen interactively in real-time, a hierarchical WT is preferred. For each merging procedure, e.g., the depth of the merged basins can be measured relatively to the lowest point on the separating crest line (the merging point, where the watershed would be constructed). These merging procedures can be stored in their order of occurrence or hierarchy in a list without merging any basin at this pre processing step. Afterwards, for an actual choice of parameters, processing this list (in combination with the segmented image containing elementary basins) suffices to perform the desired WT with preflooding.

Another possibility to control oversegmentation is using markers. An arbitrary number of different markers can be assigned to arbitrary voxels prior to the transformation (or, in case of a hierarchical approach, prior to processing the list containing the merging information). Then, two basins are only merged, if they are not marked differently. When merging a marked basin with an unmarked one, the latter will also receive the marker of the former. After the WT, all voxels will be assigned to one of the markers—i.e. the number of different regions is determined by the number of different markers. Point markers applied to single voxels are suitable for most cases.

Automation

The preflooding concept is dependent on one parameter (constant preflooding height) or a few parameters (preflooding height as function of local image characteristics). If the problem is known, the proper (set of) parameter(s) can be determined automatically. The number of basins is monotonically decreasing with increasing preflooding height whereas its sizes are increasing. This provides the basis for robustness. The segmentation result does not change continuously with varying preflooding height but, depending on the image quality, a more or less broad range of proper values exists. The range of proper preflooding heights can be easily found as the first plateau (regarding the size of the largest emerging basin) larger than a certain threshold (the brain can be assumed to be larger than, e.g., 500 ml for adults).

On the other hand, the basin of interest may be found automatically using some basin features regarding size, shape, position, mean and minimum image intensity, etc. For the skull stripping problem, e.g., the brain is often the largest existing basin, as soon as the proper preflooding height is found.

However, automation should not be the ultimate goal if large variations in the shape or anatomy are expected. An interactive segmentation, e.g. with the above mentioned marker concept, is often a better choice for pathological or abnormal cases.

Volumetry

An important application of the present invention is volumetry, i.e. the reliable estimation of the volume of structures of interest. The invention evaluates to separate objects from neighboring objects, including some of the intermediate tissue (that is brighter or darker than the two objects); most object borders are included in the segmentation results including the unsharp region or the partial volume region.

Furthermore, for volumetry purposes it is desirable to include into the segmentation as much as possible of the adjacent structures showing a different gray scale, since, e.g., a histogram analysis that aims to account for partial volume effects profits from the knowledge of all tissue types involved. Typically, such histogram analysis is very robust and can be performed fully automatically.

In general, after applying the WT, it is essential to preserve the original image information of the basin of interest.

If parts of a connected structure should be quantified, cutting tools (like planes, discs, or hyper-planes in 4D), are used to partition (separate) this structure.

In order to reduce noise and artifacts, or to increase or decrease the amount of information in an image, resampling and interpolation of the original image data can be applied prior to the WT.

Dynamic volumetry, i.e. comparison of the volume of objects at different time points, can be performed by applying the results of the WT of one time point to all time points, whereas the gray scale based post-processing (in particular, histogram analysis) could be performed independently for each individual time point.

The invention is particularly advantageous in that it enables to realize a computer system to perform segmentation which features:

a. Robustness even against considerable image non-uniformity, image noise, other image disturbances, and low image resolution;
b. High speed realizations with computational costs that are approximately of the order of the number of picture elements;
c. Interactive segmentation with small interaction costs (few point markers on the whole 3D or 4D volume often suffice to separate the structure of interest from all other structures that exhibit the same gray scale characteristic);
d. High quality and reproducibility of derived measures, such as object volumes;
e. No geometrical assumptions, respectively anatomical a priori knowledge, except the connectivity of structures of interest;
f. Openness to the integration of geometrical models and anatomical assumptions;
g. Fully automatic segmentation and interactive semi-automatic segmentation;
h. Accurate volumetry, since object borders are included in the segmentation.

It is to be noted that the application of the invention to a digital image provides one or more basins. One or more of such basins are further processed in a post-processing step. In some applications the basin or the basins are regarded as the segmentation result. This is the case for visualization where the post-processing is performed to transform the transparency of a region surrounding a region of interest within the basin. This is also the case for volumetry applications. However, in other applications of the invention the basin or basins which are initially identified are the basis for further segmentation. Further segmentation of a basin can be performed by means of any prior art gray-scale based segmentation method.

BRIEF DESCRIPTION OF THE DRAWINGS

A more complete appreciation of the invention and many of the attendant advantages thereof will be readily understood from the following detailed description of preferred embodiments when considered in connection with the accompanying drawings, wherein.

DETAILED DESCRIPTION OF THE PREFERRED EMBODIMENTS

Figure 1:
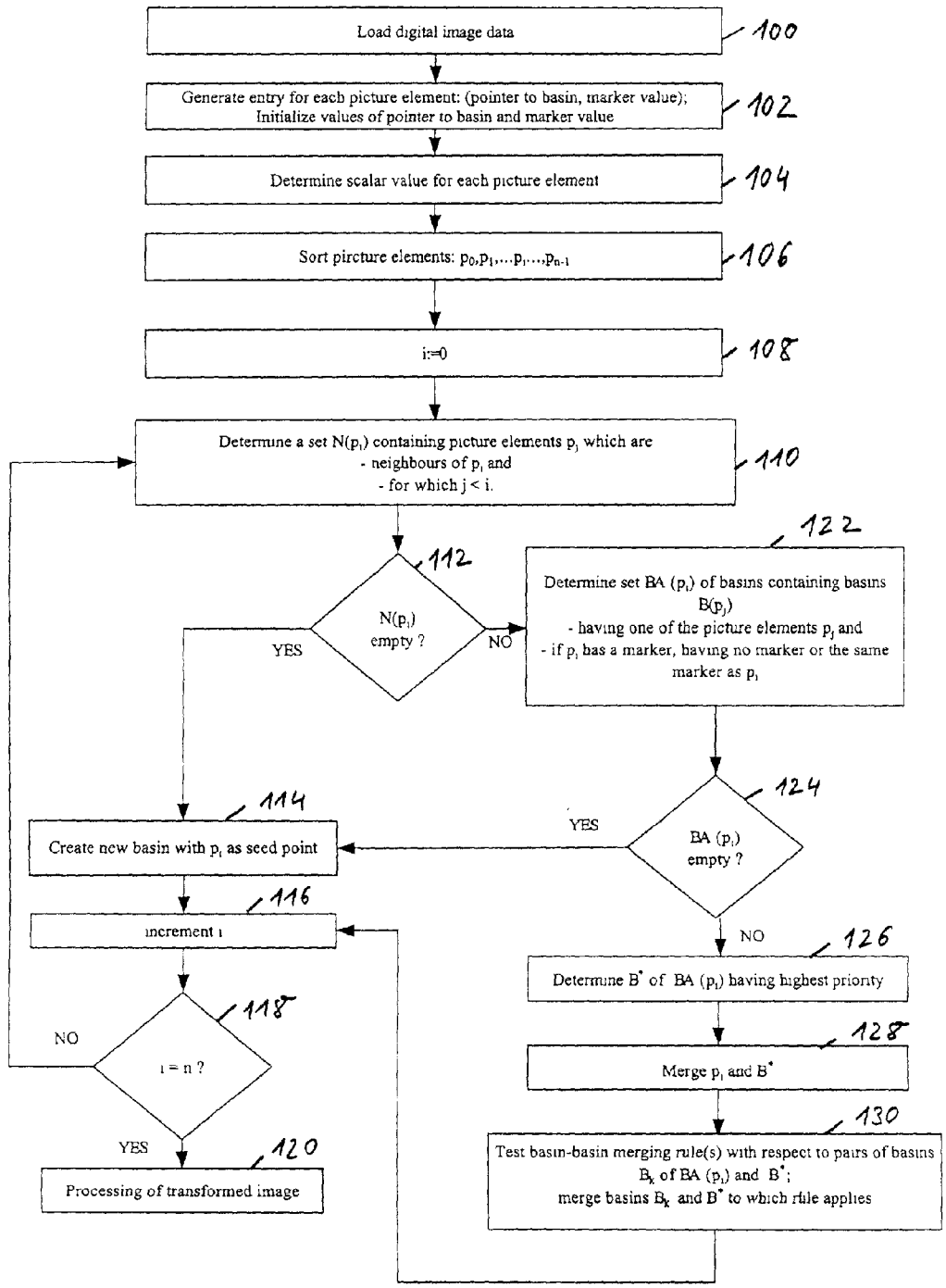
FIG. 1: is illustrative of a preferred watershed transformation method in accordance with an embodiment of the invention.

FIG. 1 shows a preferred embodiment of a watershed transformation method in accordance with a first embodiment of the invention.

In step 100 digital image data is loaded. The present invention is not restricted with respect to the kind of image data and is broadly applicable to a variety of classes of image data. The present invention is particularly useful for medical image data, in particular digital image data acquired from computer tomographic images, magnetic resonance images and T1-weighted magnetic resonance images. Further it can be advantageously employed to other radiologic images.

In step 102 a data entry is generated for each picture element of the digital image data. Typically digital image data comprises a large number of picture elements, i.e. pixels for two-dimensional images and voxels for three-dimensional images. In addition there are also four-dimensional images where the fourth dimension is time. Such four-dimensional images are acquired for observation of ongoing processes like the flow of a fluid, the volume change of a structure of interest, or the pulsation of a human heart.

In the latter case a time series of three-dimensional image data is acquired and stored in a four-dimensional array. In the following the term "picture element" will be used to designate a pixel or a voxel or a voxel at a specific time depending on the kind of digital image data.

For each such picture element a data entry is generated comprising a pointer to a basin and a marker value. Both the pointer to a basin and the marker value are initialized to be equal to zero. This indicates that no pointer to a basin and no marker value are present in the data entry. It is to be noted that the "marker value" in the data entry is optional and is only used if a user can interactively mark individual picture elements or if automatic marking is used.

In step 104 a scalar value is determined for each picture element. In one embodiment the scalar value is identical to a color coordinate or a gray value of the picture element. In this case the scalar value is already present in the picture element data itself.

In another embodiment the scalar value is determined by evaluating all data belonging to a picture element by means of a transformation function. It is important to note that the scalar value is determined in this case only taking into consideration the picture element data of the picture element for which the scalar value is to be determined but not of other picture elements.

For example, the scalar value can be calculated by transforming the color coordinates, the gray value and/or other pictorial information contained in the picture element.

In step 106 the picture elements are sorted. The sorting criteria is the scalar value determined in step 104. This results in a sequence of picture elements $p_i$. In the example considered here the scalar value is the gray value of a picture element and the picture elements are sorted in ascending order, i.e. the darkest picture element having the lowest gray value is the first picture element $p_0$ in the sequence and the brightest picture element having the highest gray value is the last picture element $p_{n-1}$ in the sequence.

In step 108 the index i is initialized to be zero. This way, a loop is started for processing all picture elements in the sequence determined in step 106 starting with the first picture element $p_0$ in the sequence.

In step 110 a set of picture elements $N(p_i)$ is determined. All picture elements $p_j$ contained in the set $N(p_i)$ are neighbors of the picture element $p_i$ in the original digital image and the gray values of those neighboring picture elements $p_j$ are lower than the gray value of the considered picture element $p_i$. In other words the indices j of the picture elements $p_j$ is lower than the index i of the considered picture element $p_i$.

For the first picture element $p_0$ in the sequence determined in step 106 the set $N(p_i)$ is empty as—by definition—there are no picture elements $p_j$ for which j<i. However, for other picture elements $p_i$ with i>0 picture elements $p_j$ in the neighborhood of $p_i$ which have a lower gray value than $p_i$ can be found.

In step 112 it is determined whether the set N is empty or not. If the set N is empty the control goes over to step 114. In step 114 a new basin is created with the picture element $p_i$ as a seed point. In step 116 the index i is incremented and in step 118 it is determined if i equals n.

If this is not the case the control goes back to step 110 with the incremented value of the index i for processing of the consecutive picture element of the sequence determined in step 106.

If i equals n the control goes to step 120 as all picture elements $p_i$ of the sequence have been processed. In step 120 a step of post-processing of the watershed transformed image is then performed. The kind of post-processing step or steps depends on the desired application such as visualization, segmentation or quantification, e.g. measurement of volumes. The post-processing performed in step 120 will be explained below in greater detail.

In case the set $N(p_i)$ is not empty the control goes from 112 to 122. In step 122 a set of basins $BA(p_i)$ is determined. This set BA contains the basins $B(p_j)$. A basin $B(p_j)$ is a basin having a picture element $p_j$ of the set N. In other words the basins for all picture elements $p_j$ contained in the set N are determined. Those basins $B(p_j)$ form the set $BA(p_i)$ In addition—if the marker concept is used—it is tested, if a basin $B(p_j)$ has a marker. If the basin $B(p_j)$ has no marker or the same marker as the considered picture element $p_i$ or if the considered picture element $p_i$ has no marker the corresponding basin $B(p_j)$ is defined to be a member of the set $BA(p_i)$. If the contrary is the case the basin $B(p_j)$ does not form part of the set $BA(p_i)$.

In other words, step 122 serves to determine the set of basins containing at least one of the neighboring picture elements $p_j$ of $p_i$ as candidates for a merging operation.

In step 124 it is determined whether the set $BA(p_i)$ is empty. If this is the case the control goes to step 114 to create a new basin with $p_i$ as seed point as there are no basins with which the picture element $p_i$ could be merged.

If the contrary is the case step 126 is carried out to determine the basin B* of the set $BA(p_i)$ having the highest priority. In this example, priority is defined such that the basin B* having the highest priority is the basin of the set $BA(p_i)$ having the darkest seed point, i.e. the seed point with the lowest gray value.

In step 128 the picture element $p_i$ is merged with the highest priority basin B*. This way the picture element $p_i$ is assigned to the basin B and forms part of this basin B* from now on.

In step 130 one or more basin-basin merging rules are applied with respect to pairs of basins formed of basins $B_k$ contained in the set $BA(p_i)$ and the highest priority basin B*. Those pairs of basins $B_k$ and B* to which one of the basin-basin merging rules applies are merged, i.e. $B_k$ is merged with B*. In case that more than one basin-basin merging rule is used, in a preferred embodiment of the invention, all basin-basin merging rules have to apply with respect to a pair of such basins as a precondition for merging of the basins. Examples of basin-basin merging rules will be explained in greater detail with respect to FIGS. 3 and 4.

The index i is incremented in step 116.

After the index i has reached the value n the whole digital image data has been processed and the watershed transformation is complete resulting in one or more basins identified in the original image.

It is to be noted that the above described watershed transformation method in accordance with the invention is particularly advantageous in that it is robust for a large class of different digital image data and also prevents oversegmentation. However, other watershed transformation methods can also be used including watershed transformation methods known from the prior art.

Figure 2:
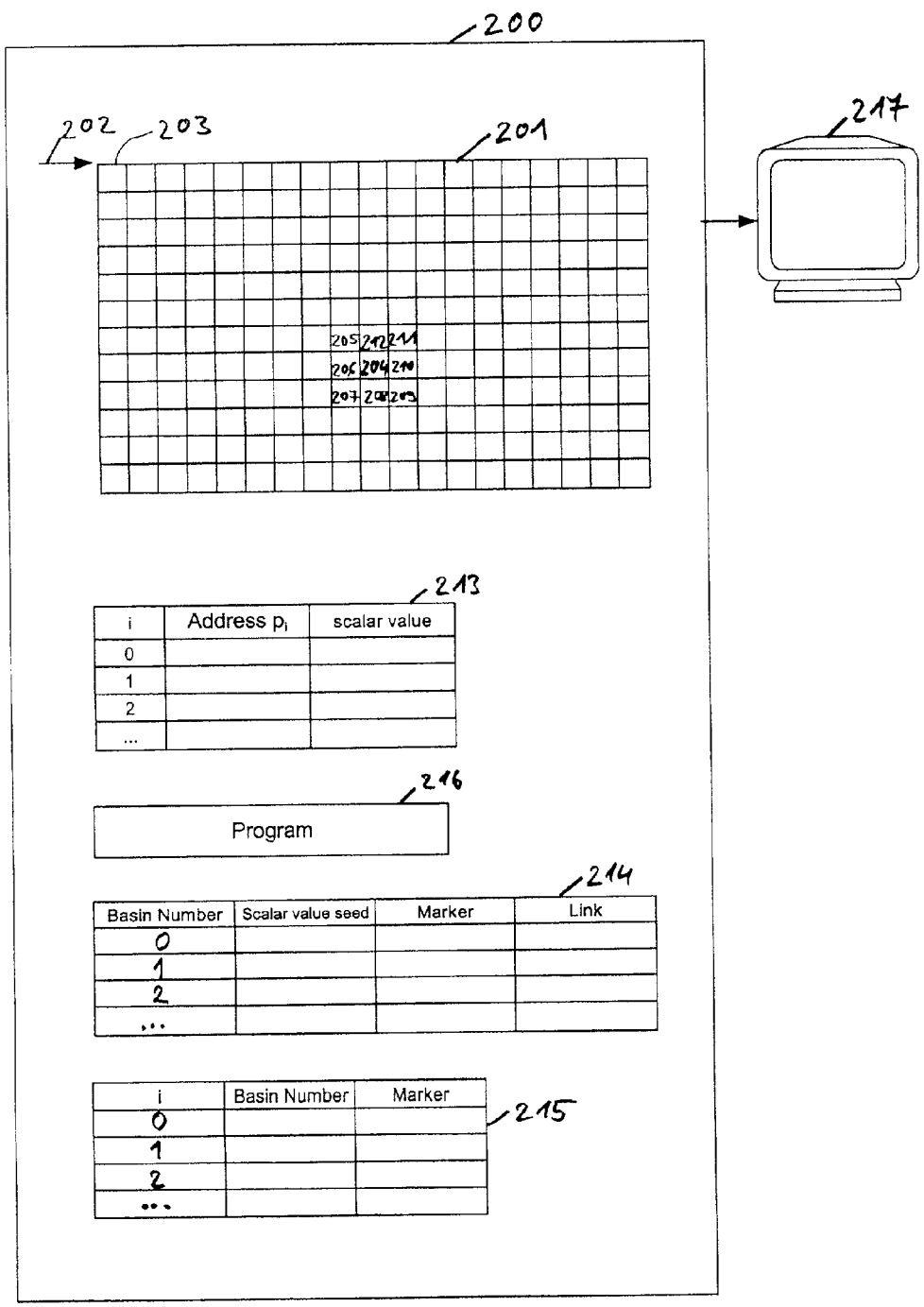
FIG. 2: is a block diagram of an embodiment of a computer system for segmentation of a digital image.

FIG. 2 shows a block diagram of an embodiment of a computer system of the invention. The computer system 200 has a memory 201 for storage of digital image data. The memory 201 is organized as an n-dimensional storage array.

In the example considered in FIG. 2 the storage array of the memory 201 is two-dimensional; for other applications the array can have three, four or more dimensions. To perform an access operation to the memory 201, the memory 201 has a pointer 202 pointing to a memory element 203 providing an entrance point into the storage array.

When a digital image is loaded into the computer system 200 (cf. step 100 of FIG. 1) the individual picture elements of the digital image are stored in corresponding memory elements of the memory 201. Preferably the topological ordering of the picture elements is preserved when the digital image data is loaded into the memory 201. In other words, if a picture element $p_i$ is stored in memory element 204 the neighboring picture elements of this picture element $p_i$ are stored on neighboring memory elements 205 to 212 while preserving the original topology.

Further the computer system has a memory 213 for the storage of a list of addresses of memory elements within the storage array of the memory 201. The list of addresses corresponds to the sequence of picture elements $p_0, p_1, \ldots p_i, \ldots p_{n-1}$ as explained above with respect to step 106 (cf. FIG. 1). In the example considered here the top most element of the list stored in the memory 213 identifies the first picture element $p_0$ in the sequence by means of the storage address of its corresponding memory element within the memory 201. Likewise the following addresses identify consecutive picture elements $p_1$, $p_2$ ... of that sequence.

In case the scalar value of each picture element (cf. step 104 of FIG. 1) is not contained in the picture element data itself an additional entry is required in the list stored in the memory 213 for the scalar value. This way the scalar value of each picture element within the sorted sequence can be directly accessed.

Further the computer system 200 has a memory 214 for storage of a basin list. The basin list of the memory 214 has four entries per basin. The first entry is the basin number, the second entry is the scalar value of the seed point of this basin, the third value is the marker—if the marker concept is used—and the fourth entry is a link.

Initially the list stored in the memory 214 is empty. When the first basin is created in step 114 a corresponding entry is made into the list of memory 214. For example, the first basin number is zero.

The scalar value of the seed point $p_i$ is entered as well as the marker value of the seed point $p_i$—if any. Further a link is entered by entering the basin number "zero", such that the basin with the basin number zero points to itself. For merging this basin with another basin the link is changed to point to the basin number of the basin with which this basin is to be merged.

When the next basin is created in a subsequent step 114 (cf. FIG. 1) a consecutive entry in the list stored in memory 214 is created with a consecutive basin number.

The computer system 200 further contains a memory 215 for storing a list of entries for each picture element. This corresponds to step 102 of FIG. 1. Each entry in this list contains an indication of the basin number to which a picture element $p_i$ is assigned and its marker value—if any.

Instead of using two entries per picture element it is also possible to use only one entry per picture element in the list stored in the memory 215 if ranges are defined for basin numbers and for marker values. For example, if a first range has been defined for basin numbers and a second range has been defined for markers still the complete information is available:

If the number stored in the list is within the first range, this means that the picture element $p_i$ has already been assigned to a basin. In this case no marker value needs to be given within the list stored in memory 215 as the marker value for this picture element $p_i$ is the same as the marker value stored in the marker entry of the list of memory 214 for the basin to which the picture element $p_i$ is assigned.

If the value stored in the list belongs to the second range, this implies that the corresponding picture element $p_i$ has not yet being assigned to a basin. When the corresponding picture element $p_i$ is assigned to an existing basin (cf. step 128 of FIG. 1) or if a new basin is created with the picture element $p_i$ as seed point (cf. step 114 in FIG. 1) the marker value of the picture element $p_i$ is stored in the basin list of memory 214 so that the marker information in the list of memory 215 becomes redundant. This makes it possible to replace the marker information in the list stored in memory 215 by the basin number to which the picture element $p_i$ is assigned.

Further the computer system 200 has a computer program 216 which comprises a variety of program components for the performance of the watershed transformation method and post-processing of the transformed image data. Further the computer system 200 has a monitor 217 for the display of the original image data and/or the results of the watershed transformation and post-processing operations for visualization, segmentation, or quantification.

In operation, the digital image data of the image to be processed is loaded into the memory 201. The list stored in the memory 215 of entries for the picture elements is empty or contains a number of markers—if the marker concept is used. A user can interactively mark certain picture elements of the digital image data by clicking on the displayed picture elements on the monitor 217. Alternatively or in addition, automatic marking can be employed.

The lists stored in the memories 213 and 214 initially are empty.

First the picture elements stored in the memory 201 are sorted in ascending order whereby the scalar value of the picture elements is the basis for the sorting operation. This way the list stored in the memory 213 is created by a corresponding component of the program 216.

The sequence of picture elements identified by the list stored in memory 213 is processed starting with picture element $p_0$. This is done by another component of the program 216.

By processing the picture elements $p_i$ a list of basins is created in the memory 214 and merging operations between picture elements and basins can take place as reflected by the corresponding list stored in memories 215 and the link entry of the list stored in memory 214.

For example, if the basin with the basin number r is to be merged with the basin having the basin number s, this is done by setting the link entry of the basin with the number r to s. In order to determine the basin to which a given picture element $p_i$ belongs it is therefore necessary to use the basin number stored in the list of memory 215 for that picture element $p_i$ as an entry point into the list stored in the memory 214.

If the entry for this basin number in the list of memory 214 has a link pointing to the same basin number no further steps need to be performed. If, however, the link points to another basin number, this other basin number needs to be checked for another link and so forth until an entry in the list of the memory 214 has been identified with a link pointing to itself. This entry identifies the basin to which the picture element $p_i$ actually belongs.

Alternatively it is also possible to update the list stored in the memory 215, i.e. the basin numbers assigned to the picture elements, each time a basin-basin merging takes place. In this case the links of the list stored in the memory 214 become redundant. Depending on the implementation this requires more processing time in comparison to the first alternative using the links.

As a result of the watershed transformation of the image data loaded into the memory 201 one or more basins are identified automatically. This way each memory element of the memory 201 is assigned to such a basin. When the next image is loaded into the memory 201 the position of the basin or the basins can be maintained such that no watershed transformation has to be performed again. Rather post-processing of the basin or the basins can immediately start. This is particularly advantageous for volumetry and quantitative comparison of changing volumes over time within the same basin.

Figure 3:
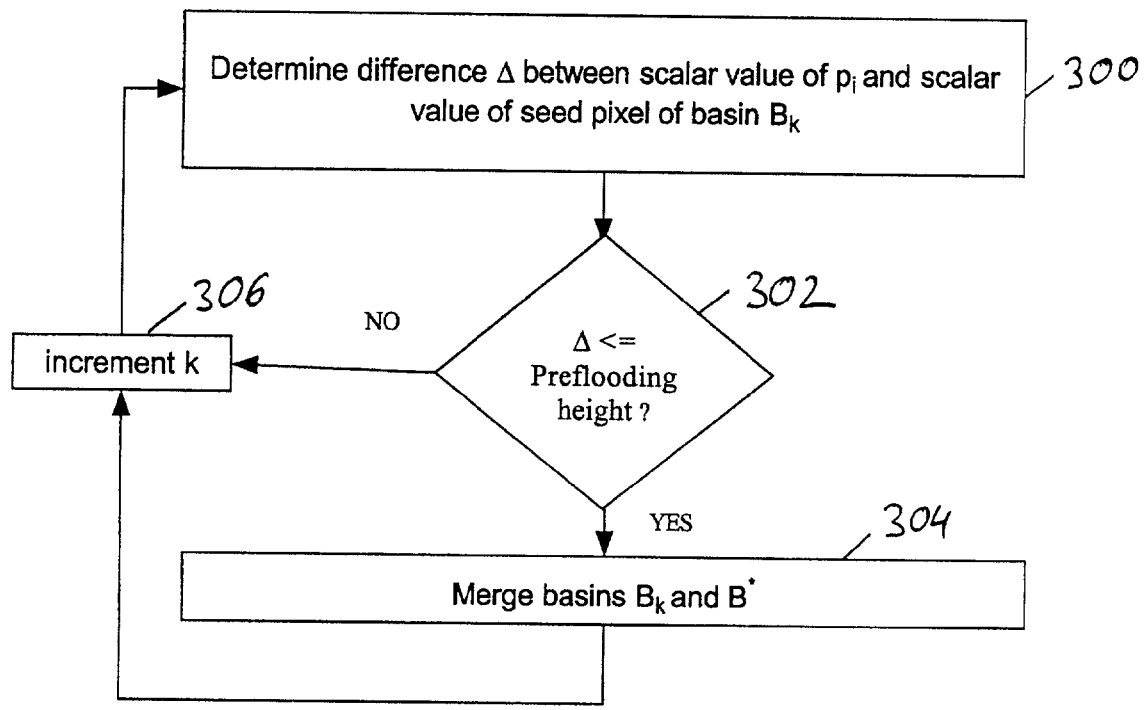
FIG. 3: is illustrative of a basin-basin merging rule using preflooding.

FIG. 3 shows an example for a basin-basin merging rule (cf. step 130 of FIG. 1) using preflooding.

For example, for application of the basin-basin merging rule depicted in FIG. 3, the control goes from step 130 of FIG. 1 to step 300 of FIG. 3. In step 300 the difference $\Delta$ between the scalar value of the picture element $p_i$ and the scalar value of the seed pixel of the considered basin $B_k$ is determined. In step 302 it is determined whether the difference $\Delta$ is lesser or equal than the preflooding height. The preflooding height is a parameter value which can be selected by the user or which can be set automatically. It is advantageous to set the preflooding height while taking into consideration the nature of the digital image data to be processed.

If the difference $\Delta$ is in fact lesser or equal to the preflooding height the basins $B_k$ and the highest priority basin B* are merged in step 304. In the computer implementation of FIG. 2 this means that the link entry in the list of memory 214 for the basin $B_k$ with the basin number k is set to the basin number of the highest priority basin B*. This way it is not necessary to update the list stored in memory 215 as the correct assignment of each picture element $p_i$ is properly identified by the link entries.

After step 304 step 306 is performed to increment k in order to test the preflooding basin-basin merging rule with respect to another pair of basins $B_k$ and B*.

If the difference $\Delta$ is greater than the preflooding height no merging of basins takes place and the control goes from step 302 directly to step 306.

Figure 4:
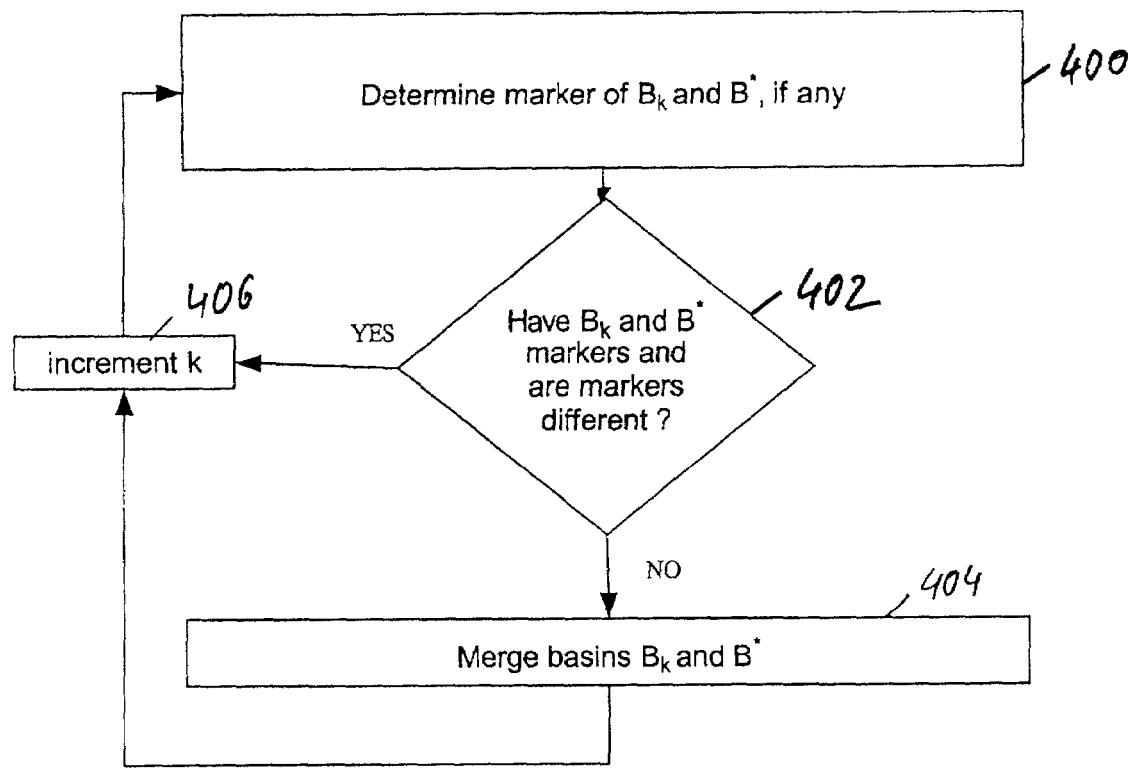
FIG. 4: is a basin-basin merging rule being based on markers.

FIG. 4 shows a marker based basin-basin merging rule which can be employed alternatively or in addition to the preflooding basin-basin merging rule of FIG. 3.

For example, the control can go directly form step 130 of FIG. 1 to step 400 of FIG. 4 or alternatively the control can go to step 400 after the preflooding basin-basin merging rule of FIG. 3 has been tested for all relevant pairs of basins.

In step 400 the markers of a pair of basins $B_k$ and the highest priority B* are determined, if any. In the computer implementation of FIG. 2 this can be done by reading the corresponding marker values from the list stored in the memory 214.

In step 402 it is determined whether both basins $B_k$ and B* have markers and if these markers are different. If this is not the case the control goes to step 404 in order to merge the basins $B_k$ and B*. Again this merging operation can be performed by setting the link entry of the basin $B_k$ in the list stored in memory 214 (cf. FIG. 2) to the basin number of the highest priority basing B*.

Step 406 is performed in order to increment the index k such that the marker based basin-basin merging rule is employed with respect to a consecutive pair of basins $B_k$ and B*.

In case it is determined in step 402 that both basins $B_k$ and B have markers and that these markers are different, no basin-basin merging is performed an the control goes directly to step 406.

Figure 5:
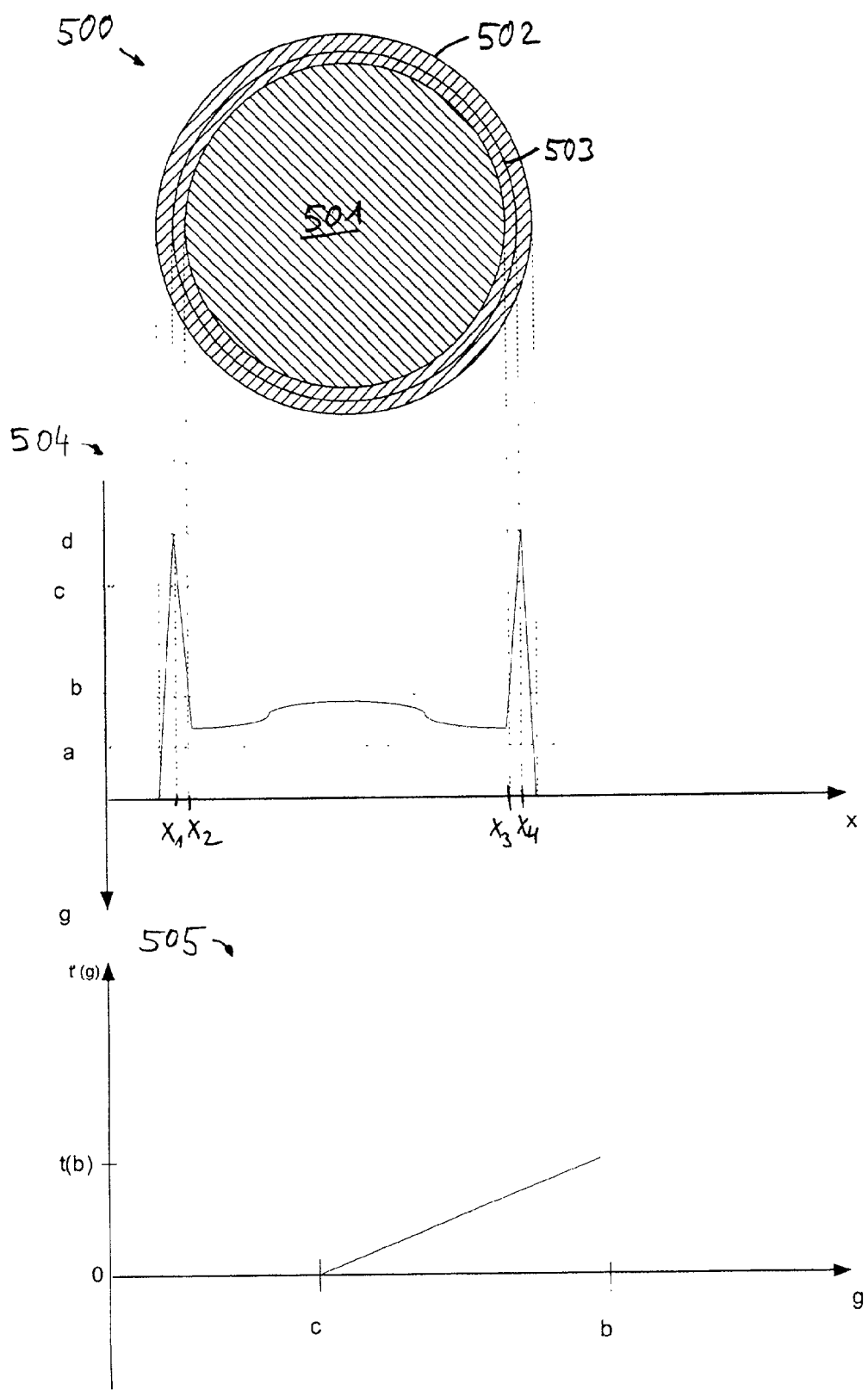
FIG. 5: is a schematic example for an application of an embodiment of the present invention for segmentation and visualization by means of a transfer function.

FIG. 5 shows a schematic example of an application of the present invention for the purposes of segmentation and visualization.

FIG. 1 schematically shows a medical image 500 such as a MR image of the skull. The medical image 500 has a region 501 which shows the brain and a region 502 which surrounds the region 501. The region 502 contains the cranial bone.

The diagram 504 shows the profile of gray values g within the medical image 500 along the x-axis. In this example, the x-axis traverses the center of the object. With respect to the skull depicted in medical image 500 it is known that the gray values within the region 501 vary between a and b whereas the gray values within the region 502 vary between c and d. Further there are partial volume effects, i.e. picture elements which partly cover tissue types of the regions 501 and 502 and which have therefore gray values g between b and c.

In the example considered here the watershed transformation method of FIG. 1 is employed to the medical image 500. This produces a basin which is circumscribed by the crest line 503. This basin contains the entire region 501 and also a part of the region 502. The crest line is formed by connected local maxima of the gray values g of the medical image 500.

For visualization of the region 501 it is desirable to remove the parts of the region 502 within the basin as circumscribed by the crest line 503. This is especially important for three-dimensional or four-dimensional display as in those cases the outer parts of the region 502 within the basin would cover the region 501 which would make the region 501 invisible on the monitor.

To remove those parts of the region 502 a transfer function is utilized. The transfer function 505 serves to transform the opacity of picture elements having gray values g below b. Opacity is the inverse of transparency. An opacity of zero corresponds to total transparency which makes the corresponding picture elements invisible on the monitor.

Those picture elements having gray values below c are made completely transparent in order to make them invisible. Picture elements having gray values between c and b are transformed by applying a linear function to gradually increase the opacity from zero. Picture elements having a gray value of b and greater are not modified and the opacities of those picture elements remain unaltered. In other words, the opacity t(b) of a picture element having a gray value of b remains unchanged as well as the opacities of picture elements having gray values bigger than b.

By applying the transfer function 505 as depicted in FIG. 5 picture elements of the basin having gray values between d and c are made completely transparent and thus completely invisible on the monitor whereas the transparency of the picture elements is gradually increased between picture elements having gray values ranging from c to b.

With respect to the diagram 504 this has the following effect: The basin which is limited by the crest line 503 extends between $x_1$ and $x_4$ along the x-axis. Those picture elements of the basin which are located in the border region between $x_1$ and $x_2$ and between $x_3$ and $x_4$ are transformed by means of the transfer function 505 in order to make the region 501 visible for three- or four-dimensional display.

In order to perform this transformation it is advantageous to use the RGBA color coordinate system as the A-coordinate directly determines the opacity t of a picture element.

Figure 6:
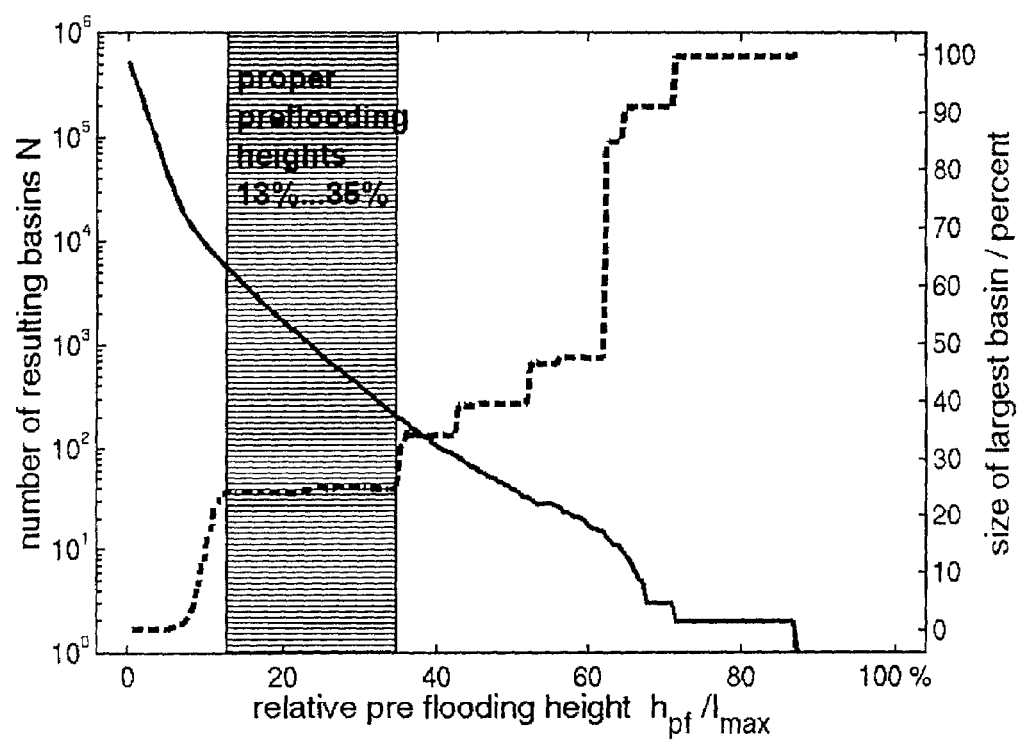
FIG. 6: is a diagram being illustrative of the algorithmic behavior of the watershed transformation with increasing preflooding height relating the number of resulting catchment basins and the size of the largest basin to the relative preflooding height.

FIG. 6 shows the algorithmic behavior of the watershed transformation method of FIG. 1 with increasing preflooding heights. The number of resulting catchment basins is depicted by the solid line and the size of the largest basin by the dashed line.

The modified watershed transformation (WT) included in the present invention is a powerful tool for segmenting the whole brain from MRI datasets. The application to the original MRI data rather than the gradient image is an approach which works excellent for brain segmentation with images showing an intensity characteristic comparable to the MR T1-signal. In particular, it is important that gray matter (GM) is at least as bright as cerebro spinal fluid (CSF) but not brighter than white matter (WM).

Assuming that the brain is surrounded by CSF and all non-brain tissue that needs to be removed shows brighter image intensities than CSF, skull stripping becomes equivalent to isolating a single hill in the four-dimensional landscape. This hill then represents the whole brain including the cerebellum and the spinal cord, as long as they are connected within the image. The valley corresponding to CSF and other low intensity tissue such as bone and meninges will then define the accurate border of the segmentation result.

After the transformation with an appropriate preflooding height one basin should exist that represents the whole brain with all parts that are connected via WM, i.e. cerebellum and spinal cord. This basin usually is the largest existing one, unless the field of view (FOV) has been selected too large. In that case, one could choose the basin containing the center of FOV or a manually selected basin.

Here the significance of the intensity characteristics of T1-weighting for this approach becomes clearly visible: The connected WM is surrounded by darker GM and even darker CSF, and can thus be regarded as the top of a hill. WM regions may not be connected in 2D, but must be connected in 3D, since the WM is interconnecting all functional parts of the brain. Therefore, a segmentation procedure is preferred that works fully in 3D, rather than 2D techniques that may not account for three-dimensional connectivity (even if they are combined with extrapolation or interpolation techniques).

Figure 7:
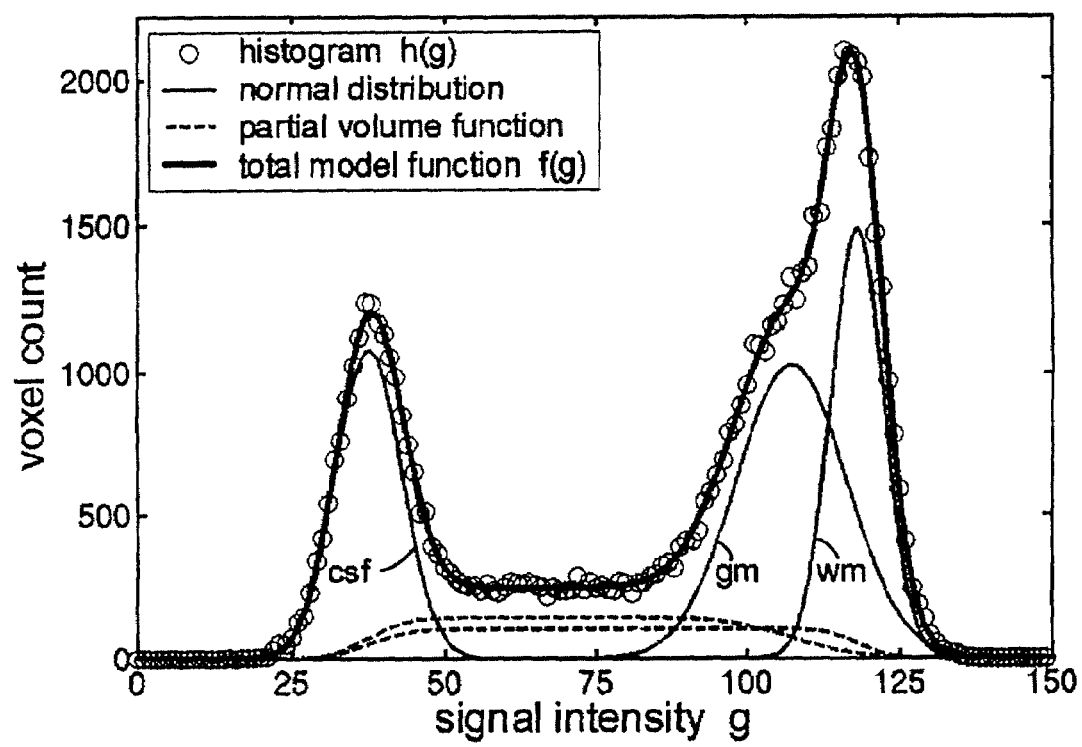
FIG. 7: is illustrative of an example for a model based histogram analysis for the purpose of volume measurement.

FIG. 7 shows a model based histogram analysis for automatic quantification, such as of CSF volumes. The model comprises three independent Gaussian functions and partial volume functions as will be explained in more detail in the following.

The histogram depicted in FIG. 7 relates to a basin as identified as a result of the watershed transformation method, e.g. by employing the method as explained above with respect to FIG. 1. With respect to the example considered in FIG. 5 this means that the basin contains the region 501 as well as parts of the region 502 surrounding the region 501.

In the case of a brain those regions comprise a variety of tissue types: cerebro spinal fluid (CSF), white matter (WM), gray matter (GM), and possibly veins and bone. To model each of these tissue types a function p is used. The corresponding Gaussian functions for CSF, GM and WM are depicted in the histogram of FIG. 7.

In addition a partial volume function $p_{\alpha\beta}$ is used to model the partial volume effects of picture elements covering two different kinds of tissue types. The dashed lines in the histogram of FIG. 7 depict two of such partial volume functions by way of example.

Based on the Gaussian functions for the tissue types and the partial volume functions a total fit function f(g) results which is fitted to the actual values of the histogram h(g) in order to determine the parameters $c_\alpha$, $s_\alpha$, $A_\alpha$, $A_{\alpha\beta}$ of the model. The corresponding formulas are given below:

$$\varphi_\alpha(x) = \frac{1}{\sqrt{2\pi} s_\alpha} \cdot \exp\left\{-\frac{(x-c_\alpha)^2}{2s_\alpha^2}\right\} \quad (1)$$

$$\Phi_\alpha(x) = \int_{x'=-\infty}^{x} \varphi_\alpha(x')dx' \quad (2)$$

$$p_{\alpha\beta}(g) = \frac{\Phi_\alpha(g) - \Phi_\beta(g)}{c_\beta - c_\alpha} \quad (3)$$

$$f(g) = \sum_\alpha A_\alpha \cdot \varphi_\alpha(g) + \sum_{\alpha,\beta|c_\alpha<c_\beta} A_{\alpha\beta} \cdot p_{\alpha\beta}(g) \quad (4)$$

$$E(c_\alpha, s_\alpha, A_\alpha, A_{\alpha\beta}; h(g)) = \sqrt{\frac{1}{|G|} \sum_{g\in G} [f(g) - h(g)]^2} \quad (5)$$

$\alpha, \beta$: tissue types, one of white matter (WM), gray matter (GM), cerebro spinal fluid (CSF), bone, etc.; condition for $\beta$: $c_\beta > c_\alpha$.

$c_\alpha$: mean gray value for tissue type $\alpha$.

$s_\alpha$: width of distribution for tissue type $\alpha$.

$A_\alpha$: number of pixels for tissue type $\alpha$.

$A_{\alpha\beta}$: number of pixels for partial volume distribution of tissue types $\alpha$ and $\beta$.

$\varphi_\alpha(x)$: normal distribution of tissue class $\alpha$.

$\Phi_\alpha(x)$: error function (i.e. integral over $\varphi_\alpha(x)$) used as auxiliary function for partial volume approximation.

$p_{\alpha\beta}(g)$: mixed Gaussian used as approximation of partial volume distribution between tissue types $\alpha$ and $\beta$.

f(g): total fit function.

h(g): histogram.

E: root mean square deviation of total fit function and histogram that is to be minimized.

Fitting the model function to the discrete histogram function is performed by minimizing mean square deviations, e.g. via a robust simplex algorithm or a gradient-descent algorithm, such as the Marquart-Levenberg algorithm. Good initial values are derived from the two most prominent histogram peaks. Once the fit converges, quantifying the corresponding CSF volume is straightforward. A cutoff value is computed such that 50% of the partial volume voxels are added to the result. For each individual measure, the expected volumetric uncertainty is calculated based on the image quality, i.e. image noise and non-uniformity, as reflected in the histogram.

In the example considered here three different partial volume functions are used for the partial volumes of CSF, GM; CSF, WM; and GM, WM. The latter is not depicted in FIG. 7.

As the Gaussian distribution functions $\varphi_\alpha(x)$ and $\Phi_\alpha(x)$ are normalized the volume of CSF within the considered basin is calculated as $A_{CSF} + \frac{1}{2} A_{CSF,GM} + \frac{1}{2} A_{CSF,WM}$.

In addition, the remaining differences between the total fit function and the values of the histogram can be taken into account for exact determination of the volume.

A listing of the reference numerals found in the drawings and throughout the specification is now provided. While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

PARTS LIST computer system 200
memory 201
pointer 202
memory element 203
memory element 204
memory element 205
memory element 206
memory element 207
memory element 208
memory element 209
memory element 210
memory element 211
memory element 212 memory 213
memory 214
memory 215
program 216
monitor 217
medical image 500
region 501
region 502
crest line 503
diagram 504
transfer function 505

What is claimed is:

1. A method for segmentation of a digital image being represented by picture element data, the method comprising the steps of:
   performing a watershed transformation of the digital image by applying a watershed transformation method on the picture element data to provide one ore more basins,
   post-processing of at least one of the basins by processing the picture element data belonging to the at least one of the basins, where the post-processing is selected from the group of post-processing steps consisting of:
   i. gray-scale based segmentation,
   ii. visualization using a transfer function,
   iii. volumetry using histogram analysis.

2. The method of claim 1 further comprising:
   determining a scalar value for each picture element by applying a transformation onto the corresponding picture element data,
   applying the watershed transformation on the scalar values to provide the one or more basins.

3. The method of claim 1 whereby the digital image is a medical image, comprising one or more anatomical structures to be segmented.

4. The method of claim 1, the picture element data being three- or four-dimensional.

5. The method of claim 1 further comprising a step to prevent oversegmentation by means of applying one or more basin-basin merging rules during the watershed transformation.

6. The method of claim 5 wherein a preflooding rule is used as a basin-basin merging rule.

7. The method of claim 5 wherein a marker based rule is used as a basin-basin merging rule.

8. The method of claim 1 whereby the watershed transformation method is a hierarchical watershed transformation method.

9. The method of claim 1, the digital image comprising a first anatomical structure of a first tissue type having a first range of gray values and a second anatomical structure of a second tissue type having a second range of gray values, whereby the watershed transformation is performed to provide a basin comprising the first anatomical structure and a portion of the second anatomical structure, further comprising the steps of:
   transforming the picture element data of the basin having gray values within the second range to make these picture elements transparent,
   applying a transfer function to the picture element data having gray values between the first and the second ranges to gradually increase the transparency of the corresponding picture elements.

10. The method of claim 1 further comprising analyzing a histogram of the picture element data of at least one of the segments for quantification purposes.

11. The method of claim 10 further comprising the steps of:
   providing a distribution function for each tissue type included within the segment,
   providing a partial volume function for each pair of tissue types,
   providing a total fit function based on the distribution functions and the partial volume functions,
   choosing parameters for the distribution functions and the partial volume functions to approximate the total fit function to the histogram,
   determining the volume of at least one of the tissue types within the segment by evaluating the parameters of the distribution function of that tissue type and of partial volume functions of pairs of tissue types which comprise that tissue type.

12. The method of claim 11 whereby the distribution functions are Gaussian functions and whereby the parameters of the partial volume functions are weighted by a factor of 0,5 for the evaluation.

13. A computer program product stored on a computer readable medium for performing a method in accordance with claim 1.

14. A computer system comprising
   a memory component for storing picture element data of a digital image,
   a first program component for performing a watershed transformation of the digital image by applying a watershed transformation method on the picture element data to provide one or more basins,
   a second program component for post-processing of at least one of the basins by processing the picture element data belonging to the at least one of the basins to provide one or more segments.

15. The computer system of claim 14 further comprising a third program component for determining a scalar value for each picture element by applying a transformation only onto the corresponding picture element data and wherein the first program component is adapted to applying the watershed transformation onto the scalar values.

16. The computer system of claim 14 further comprising a fourth program component to apply at least one basin-basin merging rule to prevent oversegmentation during the watershed transformation.

17. The computer system of claim 14, the second program component being adapted to apply a transfer function to gradually increase the transparency of picture elements having gray values between a first range and a second range of gray values, the first and second ranges of gray values corresponding to first and second tissue types.

18. The computer system of claim 14 further comprising a fifth program component for analyzing a histogram of the picture element data of one of the segments.

19. The computer system of claim 18, the fifth program component being adapted to determine a volume of a tissue type comprised within the segment by means of analyzing the histogram.

20. The computer system of claim 14, the first program component being adapted to perform the watershed transformation only once for a sequence of digital images and to maintain the segmentation result for consecutive digital images of the sequence, the second program component being adapted to perform the post-processing of the at least one of the basins by processing the picture element data of the actual digital image of the sequence belonging to the at least one of the basins to provide one or more segments.

* * * * *